Dec. 30, 1952 — L. FORTUNATO — 2,623,720
AIRCRAFT CONSTRUCTION
Filed Aug. 24, 1951 — 2 SHEETS—SHEET 1
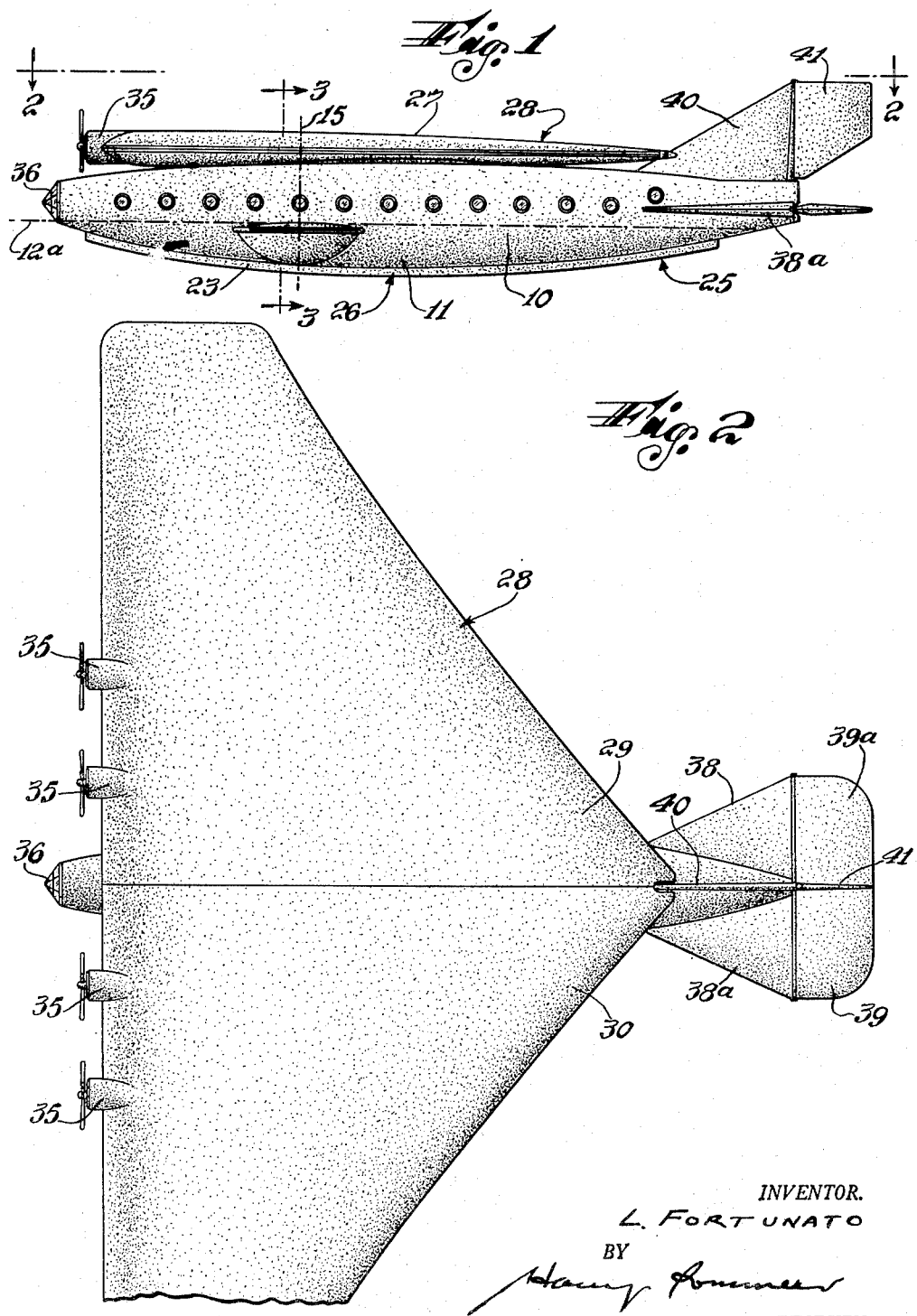
INVENTOR.
L. FORTUNATO
BY
ATTORNEY

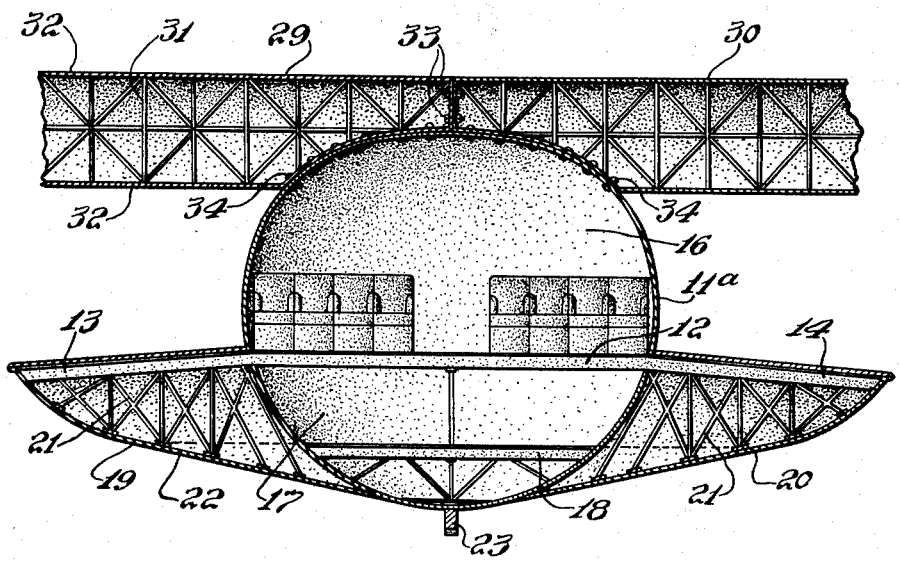
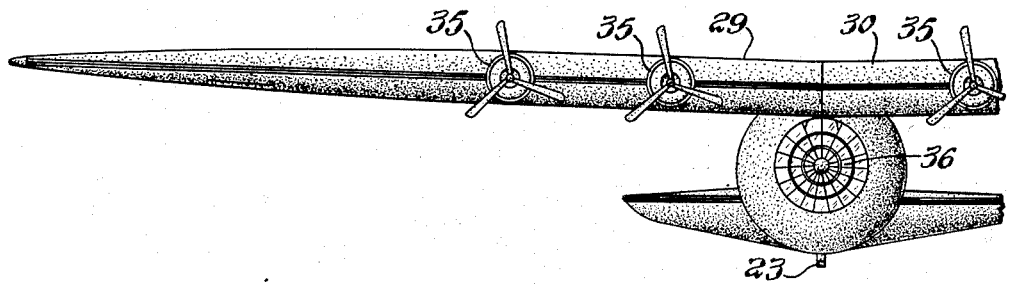

Patented Dec. 30, 1952

2,623,720

UNITED STATES PATENT OFFICE 2,623,720

AIRCRAFT CONSTRUCTION

Louis Fortunato, Newark, N. J.

Application August 24, 1951, Serial No. 243,426

2 Claims. (Cl. 244—106)

This invention relates to features of construction of an aircraft imparting characteristics of safety and stability thereto. The aircraft of this invention is so designed as to enable it to be originally manufactured so that the structural features thereof including the center of gravity will be so disposed as to provide safety factors which will become apparent as the description progresses.

Important features of construction, and the advantages thereof, will become apparent from the description below:

In the drawings:

Fig. 1 is a side elevational view of an aircraft constructed in accordance with the invention, Fig. 2 is a top plan view thereof, partly fragmentary, taken on line 2—2 of Fig. 1, Fig. 3 is partly fragmentary, sectional view, taken on line 3—3 of Fig. 1, and Fig. 4 is a fragmentary front elevational view of the aircraft.

An illustration of one form of aircraft 10 embodying the invention is shown in the drawings, comprising an elongated cabin 11 built around a floor beam 12 co-extensive with the length and width of said cabin and defining a line 12a (Fig. 1), said floor beam being made of any suitable material such as an alloy of the type used in aircraft construction. A pair of arms 13, 14 extend laterally from the floor beam at a point disposed from the front of the cabin approximately one-third the length of the cabin, as indicated by reference character 15 of Fig. 1, said arms being preferably formed as unitary lateral extensions of the floor beam, thus providing a structure of inherent rigidity. The floor beam 12 divides the cabin into a horizontal compartment 16, which may be used for passengers, and a lower compartment 17 which may be used for freight, and which may be connected with compartment 16 by suitable doors or the like. The lower compartment may, in turn, be provided with a second beam 18, for reenforcement purposes. The cabin 11 is provided with a wall 11a of generally circular cross-section (Fig. 3). Pontoons 19, 20, depend from the arms 13, 14 of the beam 12 and may be secured thereto by bridgework 21 or the like, with a suitable covering 22 over said bridgework and arms. A keel 23 is secured medially to the underside of the cabin and is preferably coextensive with the length thereof to stabilize the same on water. The cabin 11 is preferably of elongated ovoidal longitudinal cross-section (Fig. 1) and the keel 23 is secured to the lower edge of the cabin medially and is coextensive with the lower edge of the cabin so as to present an arced lower edge, the apex 26 of which is disposed at a point substantially at or slightly in advance of the center of the cabin longitudinally. Thus, as the aircraft alights on a body of water, it will make contact at 26 and its forward inertia will cause the pontoons 19, 20 to contact the water and ride thereon to smoothly dispose the plane in a level position on the body of water. The pontoons are preferably arced longitudinally and their lower edges are preferably disposed at the lower edge of the cabin and thus just above the keel, thus combining therewith for stability of the aircraft on water.

The wing 28 of the aircraft is preferably formed of triangular sections 29, 30, which are secured together as at 33. The wing sections may have suitable bridgework 31 and a covering 32, which may be of metal or other material. The wing 28, assembled with the sections riveted or otherwise joined, as above outlined, is riveted or otherwise secured onto the top of the cabin 11, which partly enters the wing sections, as noted in Figs. 1 and 3, as at 34 in an arrangement such that the top edge 27 of the wing is substantially parallel to the axial center line of the cabin 11, which is the line 12a of the floor beam 12. The interior of the wing sections may be used for storage of fuel.

Suitable motors 35, of jet, rocket or propeller type, are secured to the wing 28. The wing is substantially coextensive with the length of the cabin but is slightly shorter than the same and is disposed so that the forward end 36 of the cabin is in advance of the leading edge of the wing. The wing is preferably of tear-drop cross-section longitudinally, as will be noted from Fig. 1.

Fixed horizontal stabilizer sections 38, 38a are secured to the rear end of the cabin, and movable elevator sections 39, 39a are secured to said horizontal stabilizers, as by hingedly connecting the same thereto, said elevator sections being movable by any suitable control arrangement passing through the aircraft and operable from the pilot's compartment; the latter may, for example, be at the forward end 36 of the cabin. A vertical fin 40 is fixed to the top of the rear end of the cabin and a movable rudder section 41 is secured to the rear edge of the vertical fin 40 and movable by means of suitable controls. Reenforcing struts (not shown) may connect the wing cabin and pontoon sections.

The aircraft may be provided with wheels instead of or in addition to the pontoons, but it is primarily adapted to serve as a seaplane. If the aircraft is manufactured with the correct attention paid to weight distribution, the longitudinal center of gravity line will occur at the pontoon line 15. The plane will resist nosediving as the wide V outline of the wing will tend to stabilize the craft horizontally; the pontoons 23, being located at approximately one-third the length of the cabin and therefore closer to the forward end thereof, would normally first come in contact with the surface of the body of water on which the aircraft could be landed, the second contact then occurring at point 26 of the keel. Thus, in case of power failure, the aircraft would tend to smoothly land on the surface of a body of water and float thereon in stable position.

Having thus described my invention, what I claim as new and desire to secure by Letters Patent is:

1. An aircraft comprising a floor beam having an elongated longitudinal axis, a pair of symmetrically disposed arms extending laterally from said beam only at a point disposed from the front end of the cabin substantially one-third the length of the beam, at the center of gravity of the aircraft, an elongated cabin body coextensive with said beam and secured thereto, the beam defining the longitudinal axis of said cabin and dividing the same into horizontal compartments, a keel fixed to and medially depending from the bottom of the body, pontoons of arcuate longitudinal cross section fixed to and coextensive with said arms, depending therefrom to the bottom edge of the cabin body, and a wind of V-shaped outline secured to the top of the body, said wing having an upper surface substantially parallel to said longitudinal axis of the beam.

2. An aircraft comprising a floor beam having an elongated longitudinal axis, a pair of symmetrically disposed arms extending laterally from said beam only at a point disposed from the front end of the cabin substantially one-third the length of the beam, at the center of gravity of the aircraft, an elongated cabin body coextensive with said beam and secured thereto, the beam defining the longitudinal axis of said cabin and dividing the same into horizontal compartments, a keel fixed to and medially depending from the bottom of the body, and pontoons of arcuate longitudinal cross-section fixed to and coextensive with said arms, depending therefrom to the bottom edge of the cabin body.

LOUIS FORTUNATO.

REFERENCES CITED

The following references are of record in the file of this patent:

UNITED STATES PATENTS

| Number | Name | Date |
| --- | --- | --- |
| 1,329,336 | Curtiss | Jan. 27, 1920 |
| 1,392,279 | Kleckler | Sept. 27, 1921 |
| 1,528,970 | Griffith | Mar. 10, 1925 |
| 2,147,795 | Martin | Feb. 21, 1939 |
| 2,365,205 | Martin | Dec. 19, 1944 |
| 2,392,439 | Wallace | Jan. 8, 1946 |